US008959606B2

(12) United States Patent
Lu et al.

(10) Patent No.: US 8,959,606 B2
(45) Date of Patent: Feb. 17, 2015

(54) KEY UPDATING METHOD AND SYSTEM THEREOF

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 0 days.

(21) Appl. No.: 13/739,167

(22) PCT Filed: Aug. 31, 2012

(86) PCT No.: PCT/CN2012/080837
§ 371 (c)(1),
(2), (4) Date: Jan. 11, 2013

(87) PCT Pub. No.: WO2013/056601
PCT Pub. Date: Apr. 25, 2013

(65) Prior Publication Data
US 2014/0223524 A1 Aug. 7, 2014

(30) Foreign Application Priority Data
Oct. 18, 2011 (CN) .......................... 2011 1 0317642

(51) Int. Cl.
G06F 7/04 (2006.01)
G06F 15/16 (2006.01)
(Continued)

(52) U.S. Cl.
CPC .............. *H04L 63/06* (2013.01); *H04L 9/0891* (2013.01); *H04L 63/068* (2013.01);
(Continued)

(58) Field of Classification Search
CPC ....... G06F 11/10; H04L 63/06; H04L 63/068; H04L 63/083; H04L 9/0891; H04L 63/0853
USPC .............................................................. 726/6
See application file for complete search history.

(56) References Cited

U.S. PATENT DOCUMENTS

2008/0232591 A1* 9/2008 Jutla .............................. 380/277
2008/0247548 A1* 10/2008 Kato .............................. 380/277
(Continued)

FOREIGN PATENT DOCUMENTS

CN 101582762 A 11/2009
CN 101777983 A 7/2010
CN 102315933 A 1/2012

OTHER PUBLICATIONS

Huy Hoang Ngo, Dynamic Key Cryptography and Applications, vol. 10, No. 3, pp. 161-174, May 2010.*
International Search Report dated Nov. 29, 2012 for PCT application No. PCT.CN2012/080837.
Written Opinion dated Nov. 29, 2012 for PCT application No. PCT.CN2012/080837.

Primary Examiner — Shewaye Gelagay
Assistant Examiner — Monjour Rahim
(74) Attorney, Agent, or Firm — Ohlandt, Greeley, Ruggiero & Perle LLP (57) ABSTRACT

A key updating method and system are provided. In the method, (1) a back-end authentication system receives a current dynamic password generated by a dynamic token and authenticates the current dynamic password, and if the authentication succeeds, generates key updating information and goes to (2); (2), the back-end authentication system generates a first updating key according to the key updating information and a first initial key stored therein and copies the first updating key to a buffer of the first initial key; the dynamic token obtains and authenticates the key updating information, and if the authentication succeeds, generates a second updating key according to the key updating information and a second initial key stored in the dynamic token and copies the second updating key to a buffer of the second initial key; or if authentication fails, quits the key updating. The solution avoids risk incurred by accidental key leakage.

18 Claims, 6 Drawing Sheets

(51) Int. Cl.
*H04L 29/06* (2006.01)
*H04L 9/08* (2006.01)
*H04L 9/32* (2006.01)

(52) U.S. Cl.
CPC .......... *H04L 63/083* (2013.01); *H04L 63/0853* (2013.01); *H04L 9/0877* (2013.01); *H04L 9/3234* (2013.01)
USPC .............................................. 726/6; 713/193

(56) References Cited

U.S. PATENT DOCUMENTS

| | | |
|---|---|---|
| 2009/0006640 A1 | 1/2009 | Brouwer et al. |
| 2009/0175453 A1* | 7/2009 | Shinbori et al. .............. 380/277 |
| 2010/0290624 A1* | 11/2010 | Buer et al. .................... 380/277 |

* cited by examiner

KEY UPDATING METHOD AND SYSTEM THEREOF

FIELD OF THE INVENTION

The invention relates to information security field and particularly, to a key updating method and system thereof.

BACKGROUND OF THE INVENTION

A dynamic token is a device dedicated for generating a dynamic password, generally presented in form of hardware. The dynamic token has a built-in micro processor chip for processing data running specific password algorithm, generating a current dynamic password based on factors such as current time and the number of using times and displaying the dynamic password on its display screen.

A current dynamic password generated by the dynamic token needs to be authenticated by a back-end authentication server system. The back-end authentication server system uses algorithms, keys and dynamic factors identical to those being used inside the dynamic token. Only if the dynamic password generated by the dynamic token is identical to the dynamic password generated by the authentication server, the validity of the identity of a user who uses the dynamic token can be confirmed.

In the prior art, a key of the dynamic token is usually constant. Once the key is leaked by accident, a non-license user will use the dynamic token.

SUMMARY OF THE INVENTION

The invention provides a key updating method and a system thereof for avoiding a risk incurred by a key leaking by accident.

A key updating method comprising:

Step 1, a back-end authentication system receiving and authenticating a current dynamic password generated by a dynamic token, if the authentication succeeds, generating key updating information and going to Step 2; or if the authentication fails, quitting the key updating; and Step 2, the back-end authentication system generating a first updating key with the key updating information and a first initial key stored in the back-end authentication system, if the back-end authentication system fails to authenticate the current dynamic password with the first initial key and succeeds in authenticating the current dynamic password with the first updating key, the back-end authentication system copying the first updating key to a buffer of the first initial key; and the dynamic token obtaining and authenticating the key updating information, if the authentication succeeds, generating a second updating key according to the key updating information and a second initial key stored in the dynamic token and copying the second updating key to a buffer of the second initial key; or if the authentication fails, quitting the key updating.

A key updating method comprising:

Step 1, a dynamic token generating an active code;

Step 2, a back-end authentication system obtaining and authenticating the active code, if the authentication succeeds, going to Step 3; or if the authentication fails, quitting the key updating; and Step 3, the back-end authentication system generating a first updating key according to the active code and a first initial key stored in the back-end authentication system, if the back-end authentication system fails to authenticate a dynamic password with the first initial key and succeeds in authenticating the dynamic password with the first updating key, the back-end authentication system copying the first updating key to a buffer of the first initial key and the dynamic token generating a second updating key according to the active code and a second initial key stored in the dynamic token itself and copying the second updating key to a buffer of the second initial key.

A key updating system comprising a back-end authentication system and a dynamic token, wherein:

the back-end authentication system is configured to receive and authenticate a current dynamic password generated by the dynamic token, if the authentication fails, to quit the key updating or if the authentication succeeds, to generate key updating information and generate a first updating key according to the key updating information and a first initial key stored in the back-end authentication system; if the back-end authentication system fails to authenticate the dynamic password with the first initial key and succeeds in authenticating the dynamic password with the first updating key, to copy the first updating key to a buffer of the first initial key; and the dynamic token is configured to obtain and authenticate the key updating information, if the authentication fails, to quit the key updating, or if the authentication succeeds, to generate a second updating key according to the key updating information and a second initial key stored in the dynamic token and copy the second updating key to a buffer of the second initial key.

A key updating system comprising a back-end authentication system and a dynamic token, wherein:

the back-end authentication system is configured to obtain and authenticate an active code generated by the dynamic token, if the authentication fails, to quit the key updating; or if the authentication succeeds, to generate a first updating key according to the active code and a first initial key stored in the back-end authentication system, and if the back-end authentication system fails to authenticate the dynamic password with the first initial key and succeeds in authenticating the dynamic password with the first updating key, to copy the first updating key to a buffer of the first initial key;

the dynamic token is configured to generate the active code and generate a second updating key according to the active code and a second initial key stored in the dynamic token itself and copy the second updating key to a buffer of the second initial key;

the back-end authentication system is configured to combine the active code and the first initial key to get eighth data and generate the first updating key according to the eighth data; and the dynamic token is configured to combine the active code with the second initial key to get ninth data and generate the second updating key according to the ninth data.

Advantages of the invention: when a dynamic token is used, a key of the dynamic token stored respectively in the dynamic token and a back-end authentication system can be updated as required and the original key is eliminated after successfully key updating, and then both the dynamic token and the back-end authentication system use new keys. Compared with a constant key in the dynamic token, an updating key in the dynamic token avoids a risk incurred by a key leaking by accident and improves security and flexibility of the dynamic token.

DETAILED DESCRIPTION

For highlighting purposes, solutions and advantages of the invention, a detailed description of embodiments of the invention is set forth in accompanying with the drawings.

A solution of the invention includes a dynamic token, a terminal and a back-end authentication system, and the terminal functions as a bridge between the dynamic token and the back-end authentication system. An initial key is pre-stored in the dynamic token and the key in the dynamic token is updated in the process of interaction among the above three parts and at the same time, the key, which corresponds to the dynamic token, inside the back-end authentication system is updated synchronously, and then determining whether the key inside the dynamic token and the key, corresponding to the dynamic token, inside the back-end authentication system are successfully synchronously updated.

Embodiment 1

Embodiment 1 of the invention provides a key updating method.

Figure 1:
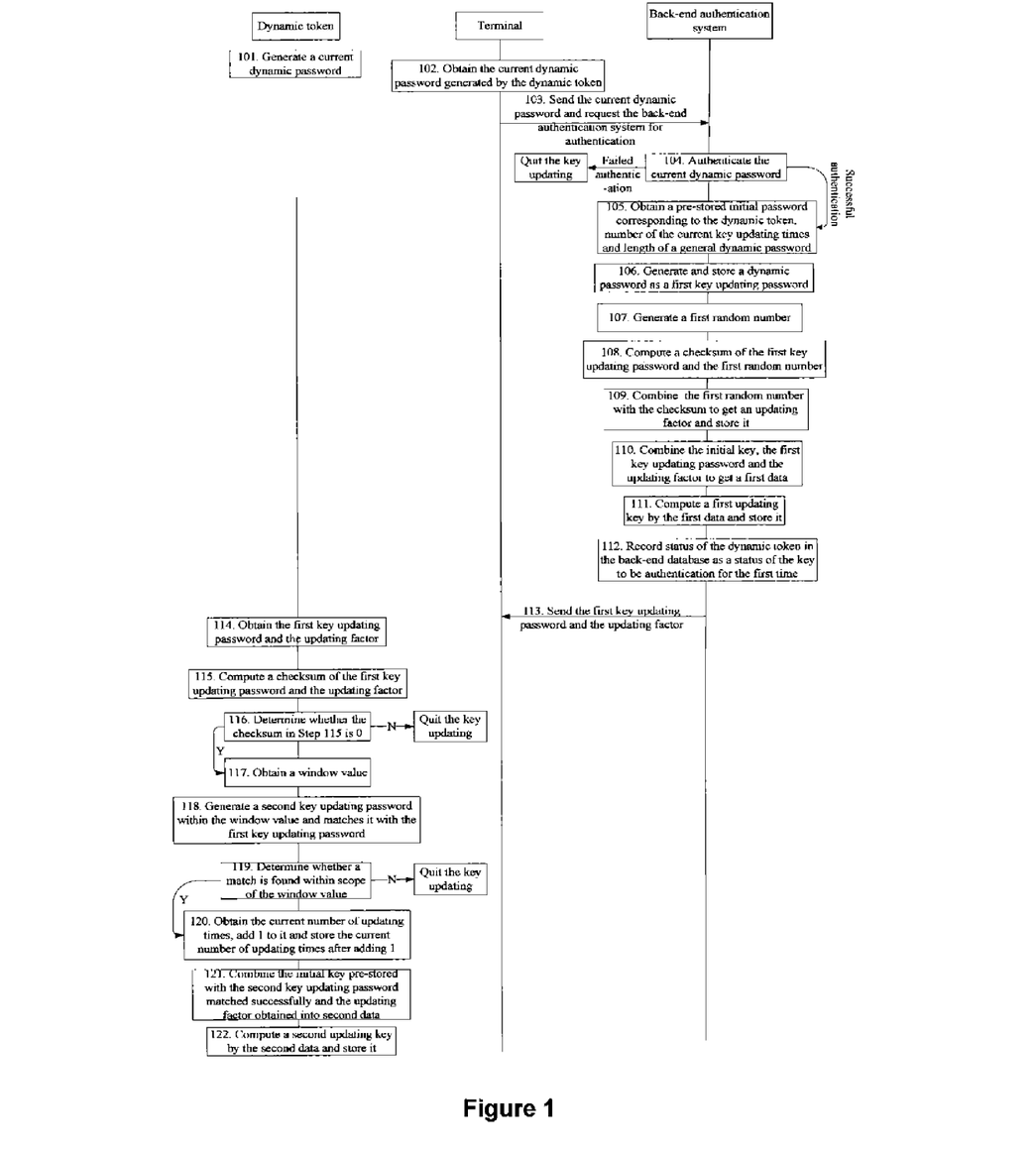
FIG. 1 illustrates a flow chart of a key updating method provided by Embodiment 1 of the invention.

As illustrated in FIG. 1, the method includes steps as follows.

Step 101, a dynamic token generates a current dynamic password.

Specifically, in the embodiment, a terminal prompts a user of inputting a dynamic password when the user requests for updating a key to a terminal.

Step 102, the terminal obtains the current dynamic password generated by the dynamic token.

Step 103, the terminal sends the current dynamic password to a back-end authentication system and requests the back-end authentication system to authenticate the current dynamic password.

Step 104, the back-end authentication system authenticates the current dynamic password. Go to Step 105 in case of successful authentication or quits the key updating in case of failed authentication.

Step 105, the back-end authentication system obtains a pre-stored initial key corresponding to the dynamic token, a current number of updating times and length of a general dynamic password.

Preferably, in the embodiment, the initial key is in form of hexadecimal number, e.g., K1, 3132333435363738393031323334353637383930.

The current number of updating times of the current key is C.

An initial value of the current number of updating times of the current key is 0.

For example, the current number of updating times of the current key C is 0 if the dynamic token updates the key for the first time.

The length of the general dynamic password is 8 digits.

Step 106, the back-end authentication system generates a dynamic password, which is considered as a first key updating password, and stores the first key updating password.

Preferably, in the embodiment, the dynamic password is an event-based dynamic password.

Accordingly, an algorithm for generating the event-based dynamic password can be event-based algorithm SM3 conforming to the National Security Standard or event-based algorithm OATH and etc. Preferably, in the embodiment, event-based algorithm OATH is selected.

Preferably, in the embodiment, the first key updating password is 84755224.

Step 107, the back-end authentication system generates a first random number.

Preferably, in the embodiment, the first random number is a number of N digits, for example, is a six-digit number 123456.

Step 107 is executed simultaneously with any step that is executed before Step 108 and after Step 104.

Step 108, the back-end authentication system computes a checksum of the first key updating password and the first random number.

Preferably, in the embodiment, the checksum is computed by LUHN algorithm.

Step 109, the back-end authentication system combines the first random number and the checksum to get an updating factor and stores the updating factor.

Preferably, in the embodiment, the way of the combination is merging.

Accordingly, the updating factor is 60927819.

Step 110, the back-end authentication system combines the initial key obtained, the first key updating password and the updating factor to get first data.

Preferably, in the embodiment, the way of the combination is merging.

Step 111, the back-end authentication system computes a first updating key by the first data and stores the first updating key.

Preferably, in the embodiment, the first updating key is computed by the first data via SHA1 algorithm of HASH function.

Accordingly, the first updating key is in form of a hexadecimal number, for example, is 883b12b0467823f7a95aa7e4bfca8bb22cd87fcb.

Step 112, the back-end authentication system records status of the dynamic token in the back-end database as status of a key to be authenticated for the first time.

Specifically, in the embodiment, the status of a key to be authenticated for the first time is status that the dynamic token stores both an initial key and an updating key, and the initial key and the updating key are to be authenticated for the first time.

Preferably, in the embodiment, the status of the key to be authenticated for the first time is an ST-NEW status.

Step 113, the back-end authentication system returns the first key updating password and the updating factor to the terminal.

Step 114, the dynamic token obtains the first key updating password and the updating factor.

Step 115, the dynamic token computes a checksum of the first key updating password and the updating factor.

Preferably, in the embodiment, the checksum is computed by LUHN algorithm.

Step 116, the dynamic token determines whether the checksum obtained in Step 115 is 0, if yes, the verification succeeds, goes to Step 117 and starts to authenticate the first key updating password; otherwise, the verification fails and quits the key updating.

Step 117, the dynamic token obtains a window value.

Specifically, in the embodiment, the window value is a predetermined number of maximum accumulation times.

Preferably, in the embodiment, the window value is 5.

Step 118, the dynamic token generates a second key updating password within the scope of the window value and matches the second key updating password with the first key updating password generated by the back-end authentication system.

Specifically, in the embodiment, the method by which the dynamic token generates the second key updating password is the same as the method by which the back-end authentication system generates the first key updating password in Step 105 and Step 106, thus details of the method are omitted.

The matching includes steps as follows.

Step A, the dynamic token generates a second key updating password and determines whether it matches the first key updating password, if yes, stores the second key updating password generated currently and skips out of the match; otherwise, Step B is executed.

Step B, current number of the accumulation times is added 1.

Preferably, in the embodiment, the initial number of the accumulation times is 0.

Step C, the dynamic token determines whether the current number of the accumulation times exceeds the scope of the window value, viz., whether the current number of the accumulation times is larger than the number of the maximum accumulation times. If yes, the match fails and quits the key updating; otherwise, goes to the next match and returns to Step A.

Step 119, the dynamic token determines whether the second key updating password generated by the dynamic token within the scope of the window value matches the first key updating password generated by the back-end authentication system. If yes, the dynamic token succeeds in authenticating the first key updating password and Step 120 is executed; otherwise, quits the key updating.

Step 120, the dynamic token obtains the current number of updating times, adds 1 to the current number of updating times and stores the current number of updating times after adding 1.

Step 121, the dynamic token combines the initial key pre-stored with the second key updating password matched and the updating factor obtained to get second data.

Preferably, in the embodiment, the way of the combination is merging.

The initial key pre-stored in the dynamic token is identical to the initial key corresponding to the dynamic token, pre-stored in the back-end authentication system in Step 105.

The initial key obtained by the back-end authentication system is identical to the initial key obtained by the dynamic token, the first key updating password is identical to the matched second key updating password, the updating factors and methods for the combination are both merging. Therefore, the second data obtained from combination is identical to the first data.

Step 122, the dynamic token computes a second updating key by the second data and stores the second updating key.

The algorithm the dynamic token used in Step 122 is the same as that used by the back-end authentication system in Step 111.

In the embodiment, after generating the second updating key, the pre-stored initial key is replaced with the second updating key by the dynamic token.

The algorithm used in the back-end authentication system is the same as that in the dynamic token; in the computing the first data is identical to the second data, thus, the second updating key computed, which is identical to the first updating key, is a key updated for the dynamic token.

The embodiment of the invention updates the dynamic token key respectively stored in the dynamic token and in the back-end authentication system and discards the original key after the key updating, and thus both the dynamic token and the back-end authentication system use new keys. Compared with a constant dynamic token key, an updating key of the dynamic token avoids a risk of key leaking by accident and improves security and flexibility of the dynamic token.

Embodiment 2

Embodiment 2 of the invention provides another key updating method.

Figure 2:
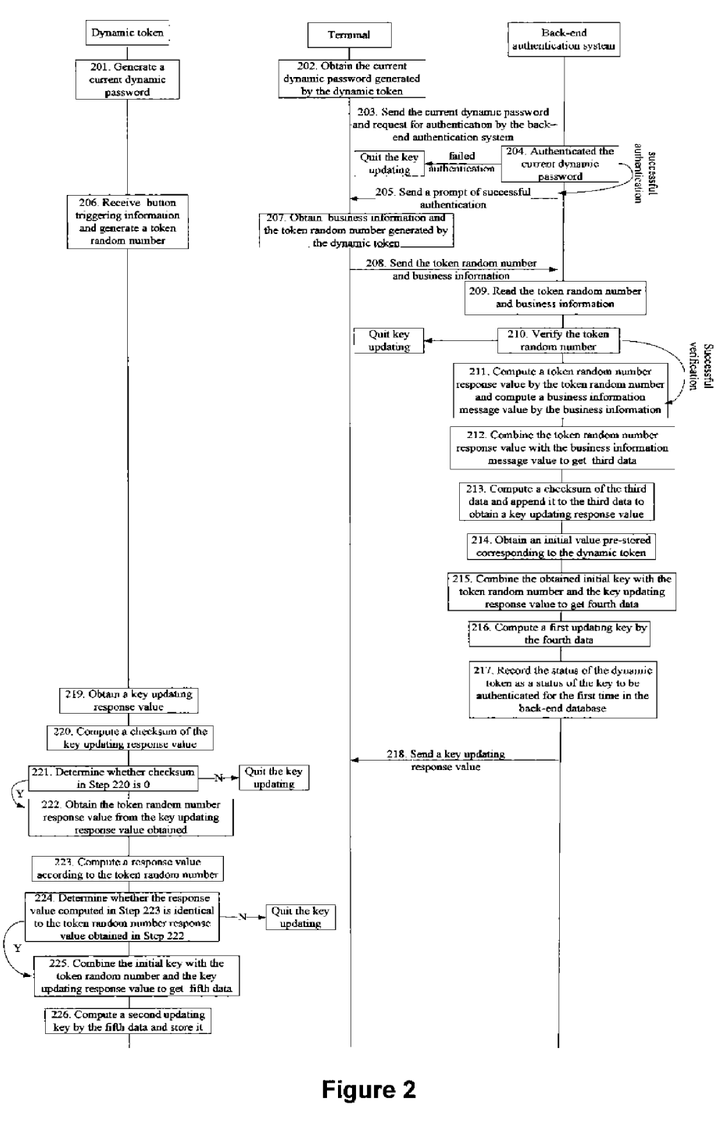
FIG. 2 illustrates a flow chart of another key updating method provided by Embodiment 2 of the invention.

As illustrated in FIG. 2, the method includes steps as follows.

Step 201, a dynamic token generates a current dynamic password.

Specifically, in the embodiment, a terminal prompts a user of inputting a dynamic password when the user requests the terminal to update a key.

Step 202, the terminal obtains the current dynamic password generated by the dynamic token.

Step 203, the terminal sends the current dynamic password to a back-end authentication system and requests the back-end authentication system to authenticate the current dynamic password.

Step 204, the back-end authentication system authenticates the current dynamic password and returns to Step 205 in case of successful authentication or quits the key updating in case of failed authentication.

Step 205, the back-end authentication system returns information of successful authentication to the terminal.

Step 206, the dynamic token generates a token random number upon receiving button triggering information.

Specifically, in the embodiment, after passing the identity authentication, the user triggers the dynamic token. The dynamic token can be triggered by one button or a combination of several buttons.

Preferably, in the embodiment, a token random number is 356824.

Step 207, the terminal obtains business information and the token random number generated by the dynamic token.

Specifically, in the embodiment, the business information is input by a user or is generated and sent to the terminal by the back-end authentication system.

The business information includes an accountant number, a transaction swift code and date and so on. Preferably, in the embodiment, the business information is 00031000220110915.

Step 208, the terminal sends the token random number and the business information to the back-end authentication system.

Step 209, the back-end authentication system reads the token random number and business information received.

Step 210, the back-end authentication system verifies the token random number and goes to Step 211 in case of a successful verification or quits the key updating in case of a failed verification.

Step 211, the back-end authentication system computes a token random number response value by the token random number and computes a business information message value by the business information obtained.

Specifically, in the embodiment, the token random number response value is a 3-digit number in the form of hexadecimal number.

Accordingly, the token random number response is 852.

The business information message value is a four-bit number in the form of hexadecimal number.

Accordingly, the business information message value is 8007.

Step 212, the back-end authentication system combines the token random number response value with the business information message value to get third data.

Preferably, in the embodiment, the way of the combination is merging.

Preferably, the token random number response value is a 3-digit number and the business information message value is a 4-digit number.

Step 213, the back-end authentication system computes a checksum of the third data and appends the checksum to the third data to obtain a key updating response value.

Preferably, in the embodiment, the checksum is computed by LUHN algorithm and the checksum is 1.

Accordingly, in the embodiment, the key updating response value is 85280071.

Step 214, the back-end authentication system obtains a pre-stored initial key corresponding to the dynamic token.

Step 215, the back-end authentication system combines the initial key obtained, the token random number and the key updating response value to get fourth data.

Preferably, in the embodiment, the way of the combination is merging.

Step 216, the back-end authentication system computes a first updating key by the fourth data.

Preferably, in the embodiment, the first updating key is computed by a SHA1 algorithm of HASH function.

Accordingly, the first updating key is in the form of hexadecimal number, for example, is 3d2dfded01cc1cff24032182aa81367200938f6.

step 217, the back-end authentication system records the current status of the dynamic token in the back-end database as a status of a key to be authenticated for the first time.

Specifically, in the embodiment, the status of a key to be authenticated for the first time is a status that the dynamic token stores both an initial key and an updating key, the initial key and the updating key are to be authenticated for the first time.

Preferably, in the embodiment, the status of a key to be authenticated for the first time is an ST-NEW status.

Step 218, the back-end authentication system sends the key updating response value to the terminal.

Step 219, the dynamic token obtains the key updating response value.

Step 220, the dynamic token computes a checksum of the key updating response value obtained.

Preferably, in the embodiment, the checksum is computed by LUHN algorithm.

Step 221, the dynamic token determines whether the checksum computed is 0, if yes, the verification is passed, Step 222 is executed and the dynamic token starts to authenticate the key updating response value; otherwise, the dynamic token quits the key updating.

Step 222, the dynamic token obtains a token random number response value from the key updating response value obtained.

Step 223, the dynamic token computes a response value according to the token random number.

The algorithm used by the dynamic token is Step 223 is the same as that used by the back-end authentication system in Step 211.

Step 224, the dynamic token compares the response value computed in Step 223 with the token random number response value obtained, if they match, the authentication of the key updating response value is successful; or if, they do not match, the authentication of the key updating response value is failed, quits the key updating.

Step 225, the dynamic token combines the initial key pre-stored with the token random number being generated and the key updating response value to get fifth data.

Preferably, in the embodiment, the checksum is computed by merging.

Because the back-end authentication system and the dynamic token obtain same initial keys, obtain same the token random number and the key updating response value and use same combination methods for example merging, the fifth data is identical to the fourth data after combination.

Step 226, the dynamic token computes a second updating key by the fifth data and stores the second updating key.

The algorithm used in Step 226 is identical to that used in Step 216, and thus details of the algorithm are omitted.

After generating the second updating key, the dynamic token replaces the initial key pre-stored with the second updating key.

The back-end authentication system and the dynamic token use the same algorithm and the fifth data used during computing is identical to the fourth data, thus, the second updating key, which is identical to the first updating key after computing, is a key updated for the dynamic token.

The embodiment of the invention updates the dynamic token key respectively stored in the dynamic token and in the back-end authentication system and discards the original key after the key updating, and thus both the dynamic token and the back-end authentication system use new keys. Comparing with a constant dynamic token key, an updating key of the dynamic token key avoids a risk of key leaking by accident and improves security and flexibility of the dynamic token.

Embodiment 3

Embodiment 3 of the invention provides another key updating method.

Figure 3:
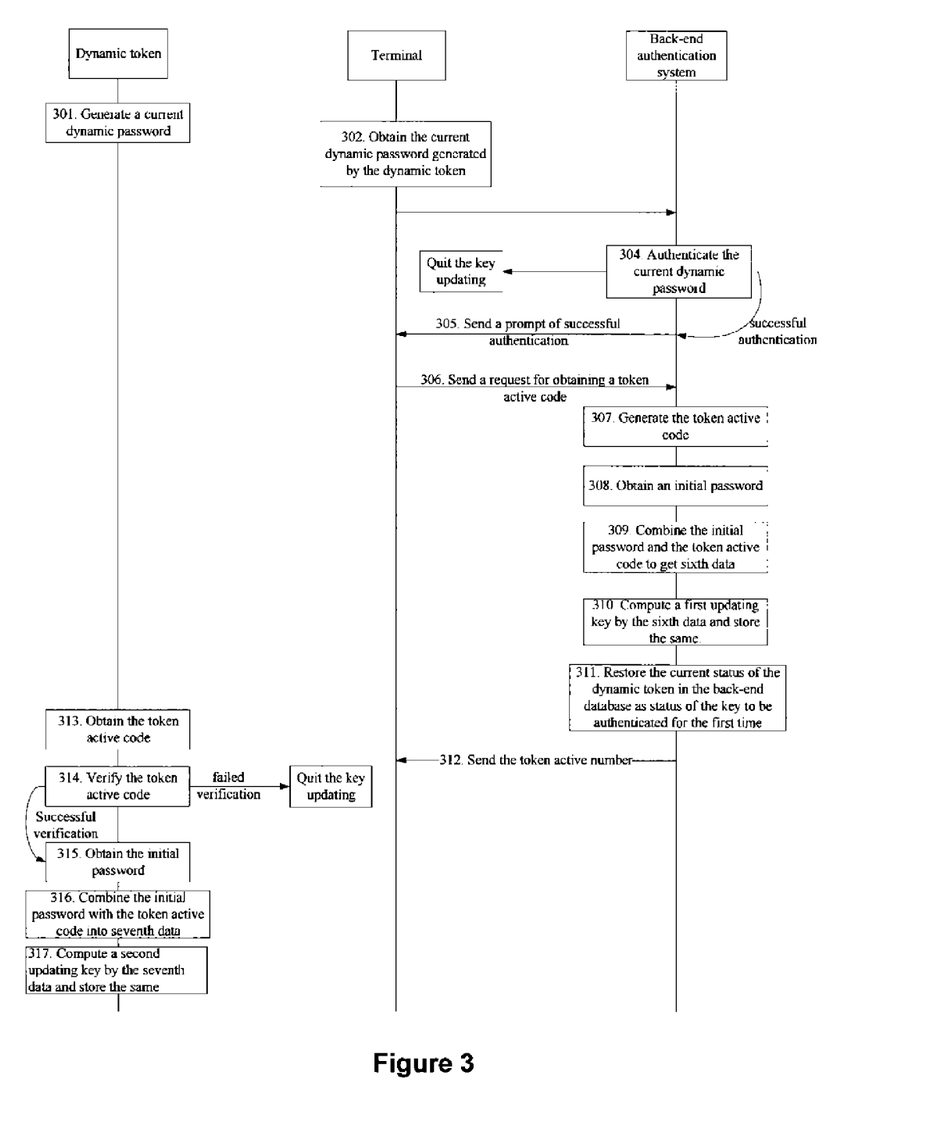
FIG. 3 illustrates a flow chart of another key updating method provided by Embodiment 3 of the invention.

As illustrated in FIG. 3, the method includes steps as follows.

Step 301, the dynamic token generates a current dynamic password.

Specifically, in the embodiment, when a user requests for updating a key to a terminal, the terminal prompts the user of inputting a dynamic password.

Step 302, the terminal obtains the current dynamic password generated by the dynamic password.

Step 303, the terminal sends the current dynamic password to a back-end authentication system and requests the back-end authentication system to authenticate the current dynamic password.

Step 304, the back-end authentication system authenticates the current dynamic password and goes to Step 305 in case of a successful authentication or quits the key updating in case of a failed authentication.

Step 305, the back-end authentication system sends a prompt of successful authentication to the terminal.

Step 306, the terminal sends a request for obtaining a token active code to the back-end authentication system.

Step 307, the back-end authentication system generates the token active code.

Preferably, in the embodiment, the token active code is 74918118.

Step 308, the back-end authentication system obtains an initial key pre-stored.

Step 309, the back-end authentication system combines the initial key with the token active code to get sixth data.

Preferably, in the embodiment, the way of the combination is merging.

Step 310, the back-end authentication system computes a first updating key by the sixth data and stores the first updating key.

Preferably, in the embodiment, the first updating key is computed by SHA1 algorithm of HASH function.

Accordingly, the first updating key is presented in the form of a hexadecimal number, for example, is fa219c3de3bd1d0b2fee82389d03396353975cbc.

Step 311, the back-end authentication system records the current status of the dynamic token in the back-end database as a status of the key to be authenticated for the first time.

Preferably, in the embodiment, the status of the key to be authenticated for the first time is an ST-NEW status.

Step 312, the back-end authentication system sends the token active code generated to the terminal.

Step 313, the dynamic token obtains the token active code.

Step 314, the dynamic token verifies the token active code obtained, and goes to Step 315 in case of successful verification, or quits the key updating in case of failed verification.

Step 315, the dynamic token obtains the initial key pre-stored.

Step 316, the dynamic token combines the initial key with the token active code to get seventh data.

The way of the combination in step 316 is the same as that in Step 309, and thus details of the combination are omitted.

Because the back-end authentication system and the dynamic token obtain same initial keys, use same token active codes and same combination methods, the seventh data combined is identical to the sixth data.

Step 317, the dynamic token computes a second updating key by the seventh data and stores the second updating key.

The algorithm used in computing is identical to that used in Step 310 and thus details of the computing method are omitted.

After generating the second updating key, the dynamic token replaces the initial key pre-stored with the second updating key.

Because the back-end authentication system and the dynamic token use same algorithm and the seventh data is identical to the sixth data, the second updating key, which is identical to the first updating key, is a new key updated for the dynamic token.

The embodiment of the invention updates the dynamic token key respectively stored in the dynamic token and in the back-end authentication system and discards the original key after the key updating, and thus both the dynamic token and the back-end authentication system use new keys. Compared with a constant dynamic token key, an updating key of the dynamic token avoids a risk of key leaking by accident and improves security and flexibility of the dynamic token.

Embodiment 4

Embodiment 4 of the invention provides another key updating method.

Figure 4:
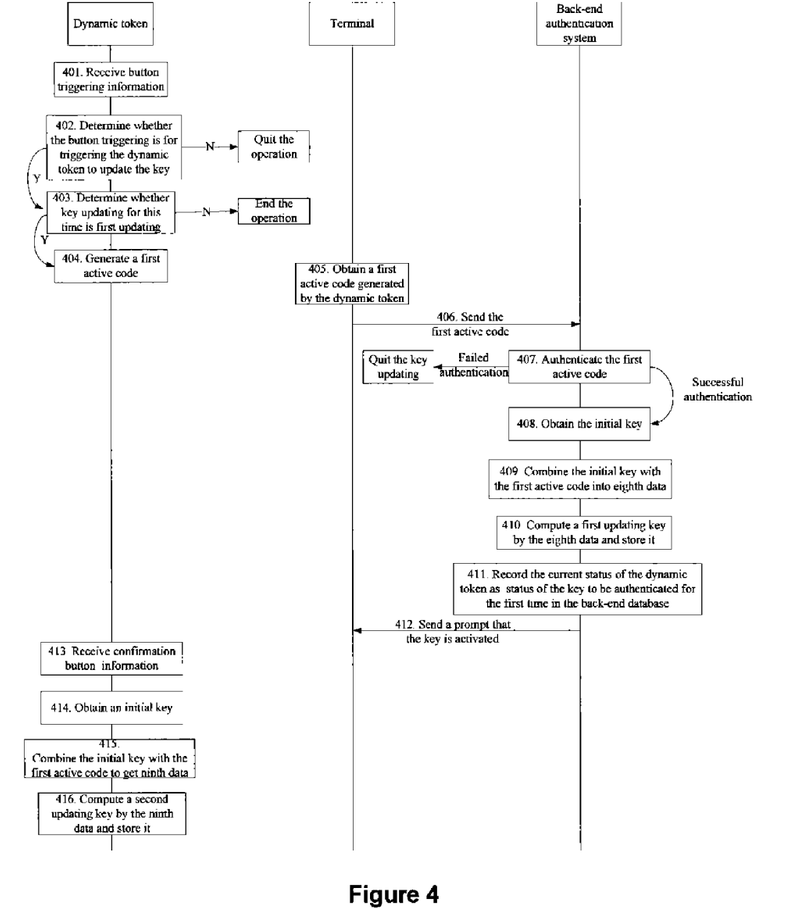
FIG. 4 illustrates a flow chart of another key updating method provided by Embodiment 4 of the invention.

As illustrated in FIG. 4, the method includes steps as follows.

Step 401, a dynamic token receives button triggering information.

Specifically, in the embodiment, when needs to update a key of the dynamic token, a user triggers the dynamic token by pressing button(s). The trigger of the dynamic token can be completed by pressing on one button or a combination of several buttons.

Preferably, in this embodiment, the trigger is completed by pressing on button.

Step 402, the dynamic token determines whether the button triggering is an operation of triggering the dynamic token for key updating, if yes, goes to Step 403; otherwise, ends the operation.

Step 403, the dynamic token determines whether the key updating is updating for the first time, if yes, goes to Step 404; otherwise, ends the operation.

An initial key was pre-stored inside the dynamic token on shipment of the dynamic token, for example K1, and preferably, in the embodiment, the key can be updated once after shipment of the dynamic token.

Step 404, the dynamic token generates a first active code.

Preferably, in the embodiment, the first active code is 79225563.

Step 405, the terminal obtains the first active code generated by the dynamic token.

Step 406, the terminal sends the first active code to a back-end authentication system.

Step 407, the back-end authentication system authenticates the first active code received and goes to Step 408 in case of a successful authentication, or quits the key updating system in case of failed authentication.

Step 408, the back-end authentication system obtains an initial key.

Step 409, the back-end authentication system combines the initial key with the first active code to get eighth data.

Preferably, in the embodiment, the way of the combination is merging.

Step 410, the back-end authentication system computes a first updating key by the eighth data and stores the first updating key.

Preferably, in the embodiment, the first updating key is computed by the first data via SHA1 algorithm of HASH function.

Correspondingly, the first updating key is bab55d645e49f3715699683cf52106dcb76c2a89.

Step 411, the back-end authentication system records the current status of the dynamic token in the back-end database as status of the key to be authenticated for the first time.

Preferably, in the embodiment, the status of the key to be authenticated for the first time is ST-NEW status.

Step 412, the back-end authentication system sends a prompt to the terminal that the key is successfully activated.

Step 413, the dynamic token receives Confirm button information.

Specifically, in the embodiment, when the terminal displays a prompt that the key is successfully activated, the user triggers the dynamic token by pressing a Confirm button.

step 414, the dynamic token obtains the initial key pre-stored.

Step 415, the dynamic token combines the initial key with the first active code generated to get ninth data.

In the embodiment, when the terminal prompts that the key is successfully activated, the user triggers the dynamic token to generate an updating key by triggering a button on the dynamic token.

The method of the combination is the same with that in Step 409 and thus details of it are omitted.

Because the back-end authentication system and the dynamic token obtain same initial keys, use same first active codes and same combination methods, the ninth data combined and eighth data combined are identical to each other.

Step 416, the dynamic token computes a second updating key by the ninth data and stores the second updating key.

The algorithm used is identical to that used in Step 410 and thus details of it are omitted.

In the embodiment, after generating the second updating key, the dynamic token replaces the initial key pre-stored with the second updating key.

Because the back-end authentication system and the dynamic token use the same algorithm and the ninth data is identical to the eighth data for computing, the second updating key computed, which is identical to the first updating key, is a new key updated for the dynamic token.

The embodiment of the invention updates the dynamic token key respectively stored in the dynamic token and in the back-end authentication system and discards the original key after the key updating, and thus both the dynamic token and the back-end authentication system use new keys. Compared with a constant dynamic token key, a updating key of the dynamic token avoids a risk of key leaking by accident and improves security and flexibility of the dynamic token.

Embodiment 5

Figure 5:
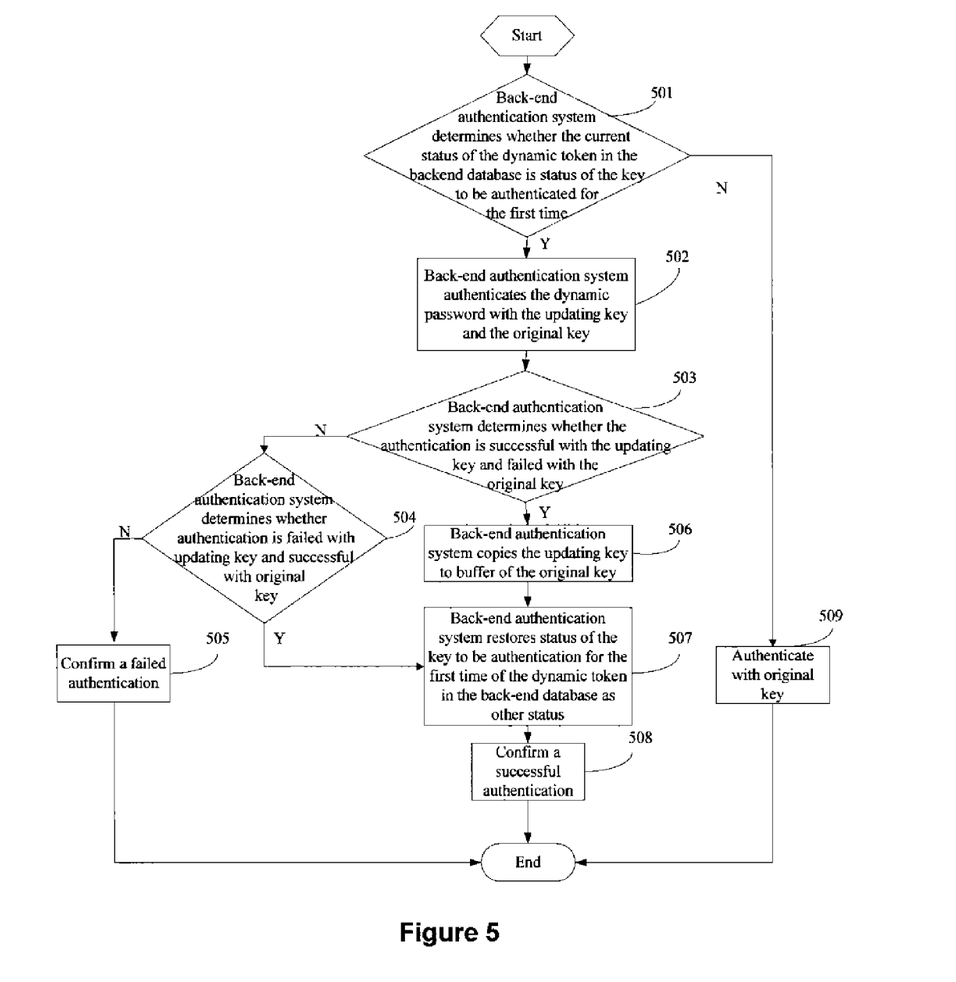
FIG. 5 illustrates a flow chart of steps added by a back-end authentication system when using the dynamic token again provided by Embodiment 5 of the invention.

Based on Embodiment 1, Embodiment 2, Embodiment 3 and Embodiment 4, when the user uses the dynamic token to authenticate the dynamic password again, the back-end authentication system performs authentication steps as follows.

The detailed steps are illustrated in FIG. 5.

Step 501, the back-end authentication system determines whether a current status of the dynamic token recorded in the back-end database is status of the key to be authenticated for the first time, if yes, goes to Step 502; otherwise, goes to Step 509.

Preferably, in the embodiment, the back-end authentication system determines whether the current status of the dynamic token recorded in the back-end database is an ST-NEW status.

Step 502, the back-end authentication system authenticates the dynamic password respectively with the updating key and an original key.

Preferably, in the embodiment, the updating key is K2.

When the key is updated for the first time, the original key is an initial key pre-stored in the back-end authentication system; when the key is not updated for the first time, the original key is a key stored in the back-end authentication system after last key updating.

Step 503, the back-end authentication system determines whether the authentication of the dynamic password with the updating key succeeds and the authentication of the dynamic password with the original key fails, if yes, goes to Step 506; otherwise, goes to Step 504.

Step 504, the back-end authentication system determines whether the authentication of the dynamic token with the updating key fails and the authentication of the dynamic password with the original password succeeds, if yes, goes to Step 507; otherwise, goes to Step 505.

Step 505, the back-end authentication system confirms that the authentication fails under status of the key to be authenticated for the first time and ends the authentication.

Step 506, the back-end authentication system copies the updating key to a buffer of the original key.

Step 507, the back-end authentication system restores the status of the key of the dynamic token to be authenticated for the first time, which is recorded in the back-end database, to be other status.

Preferably, in the embodiment, the back-end authentication system restores the ST-NEW status to other status.

step 508, the back-end authentication system confirms a successful authentication under the status of the key to be authenticated for the first time and ends the authentication.

Step 509, the back-end authentication system authenticates the dynamic password with the original key and ends the authentication.

Referring to Embodiment 1, steps executed following Step 506 further include that the back-end authentication system adds 1 to current number C of updating times and restores the current number C of updating times.

The current number C of updating times after adding 1 is taken as the current number of updating times for the next time of key updating.

The embodiment of the invention ensures an unity of keys respectively stored in the back-end authentication system and the dynamic token by authenticating the dynamic password with the updating key and the original key and determining whether copy the updating key to a buffer of the original key according to the authentication result under status of the key to be authenticated for the first time.

Embodiment 6

Figure 6:
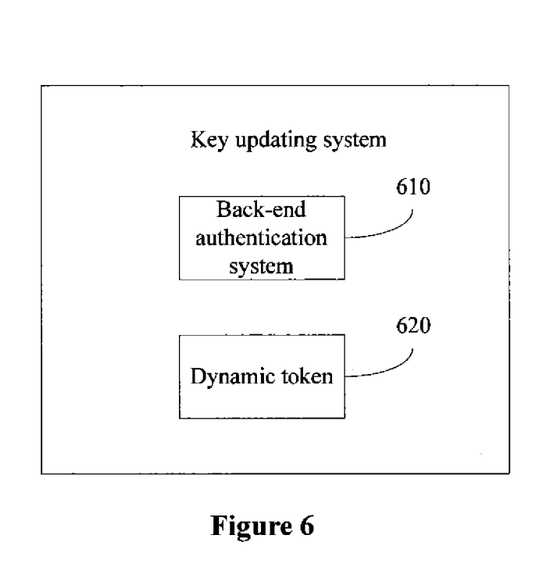
FIG. 6 illustrates a structural diagram of a key updating system provided by Embodiment 6 of the invention.

FIG. 6 is a structural diagram of a key updating system provided by Embodiment 6 of the invention, including a back-end authentication system 610 and a dynamic token 620.

The back-end authentication system 610 is configured to receive and authenticate a current dynamic password generated by the dynamic token 620, if the authentication fails, to quit the key updating; if the authentication succeeds, to generate key updating information and generate a first updating key according to the key updating information and a first initial key stored in the back-end authentication system 610. If the back-end authentication system 610 fails to authenticate a dynamic password with the first initial key and succeeds in authenticating the dynamic password with the first updating key, to copy the first updating key to a buffer of the first initial key.

The dynamic token 620 is configured to obtain and authenticate the key updating information and if the authentication fails, to quit the key updating; or if the authentication succeeds, to generate a second updating key with the key updating information and a second initial key stored in the dynamic token 620 and copy the second updating key to a buffer of the second initial key.

The key updating information includes a first key updating password and an updating factor.

Accordingly, the back-end authentication system 610 is configured to generate the first key updating password and a random number, to obtain a checksum of the first key updating password and the random number and to combine the random number with the checksum to get a first updating factor.

The back-end authentication system 610 is configured to combine the first key updating password with the updating factor and the first initial key stored in the back-end authentication system 610 to get first data and to generate the first updating key according to the first data.

The dynamic token 620 is configured to obtain a checksum of the first key updating password and the updating factor and determine whether the checksum is 0 and whether a second key updating password generated by the dynamic token 620 matches the first key updating password, if yes, the authentication succeeds, otherwise, the authentication fails.

The dynamic token 620 is configured to combine the updating factor with a second initial key and the second key updating password which matches the first key updating password to get second data and to generate a second updating key according to the second data.

The key updating information can also be a key updating response value.

Accordingly, the back-end authentication system 610 is configured to obtain a token random number and business information, to generate a token random number response value according to the token random number and to generate a business information message value according to the business information; and to combine the token random number response value and the business information message value to get third data, to obtain a checksum of the third data and combine the checksum with the third data to get a key updating response value.

The back-end authentication system 610 is configured to combine the key updating response value with the token random number and the first initial key to get fourth data and to generate the first updating key with the fourth data.

The dynamic token 620 is configured to obtain a checksum of the key updating response value and to determine whether the checksum is 0 and whether the token random number response value obtained according to the token random number is identical to the token random number response value obtained by the key updating response value, if yes, the authentication succeeds, otherwise, the authentication fails.

The dynamic token 620 is configured to combine the key updating response value with the token random number and the second initial key to get fifth data and to generate the second updating key according to the fifth data.

The key updating information can also be a token active code.

Accordingly, the back-end authentication system 610 is configured to combine the token active code with the first initial key to get sixth data and to generate the first updating key according to the sixth data.

The dynamic token 620 is configured to combine the token active code with the second initial key to get seventh data and to generate the second updating key according to the seventh data.

The embodiment of the invention updates the dynamic token key respectively stored in the dynamic token and in the back-end authentication system and discards the original key after the key updating, and thus both the dynamic token and the back-end authentication system use new keys. Compared with a constant dynamic token key, an updating key of the dynamic token avoids a risk of key leaking by accident and improves security and flexibility of the dynamic token.

Embodiment 7

Figure 7:
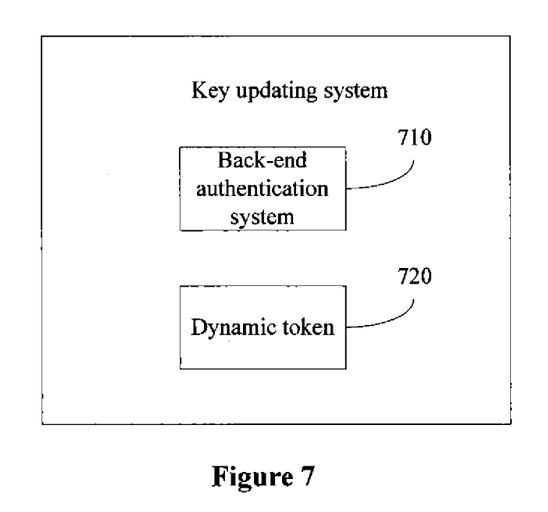
FIG. 7 illustrates a structural diagram of a key updating system provided by Embodiment 7 of the invention.

FIG. 7 is a structural diagram of a key updating system provided by Embodiment 7 of the invention, including a back-end authentication system 710 and a dynamic token 720.

The back-end authentication system 710 is configured to obtain an active code generated by the dynamic token 720 and to authenticate the active code, and if the authentication fails, to quit the key updating, or if the authentication succeeds, to generate a first updating key according to the active code and a first initial key stored in the back-end authentication system 710; and if the back-end authentication system 710 fails to authenticate a dynamic password by the first initial key and succeeds in authenticating the dynamic password by the first updating key, to copy the first updating key to a buffer of the first initial key.

The back-end authentication system 710 is configured to combine the active code and the first initial key to get eighth data and generate the first updating key according to the eighth data.

The dynamic token 720 is configured to generate the active code, to generate a second updating key according to the active code and a second initial key stored in the dynamic token itself and copy the second updating key to a buffer of the second initial key.

The dynamic token 720 is configured to combine the active code with the second initial key to get ninth data and generate the second updating key according to the ninth data.

The embodiment of the invention updates the dynamic token key respectively stored in the dynamic token and in the back-end authentication system and discards the original key after the key updating, and thus both the dynamic token and the back-end authentication system use new keys. Compared with a constant dynamic token key, an updating key of the dynamic token avoids a risk of key leaking by accident and improves security and flexibility of the dynamic token.

The above-mentioned are just preferred embodiments of the invention, not a limit to the invention and for a technician skilled in the art, all modifications and amendments can be included in the invention. All modification, substitution and amendments within the spirit and the principle of the invention should be protected by the invention.

The invention claimed is:
1. A key updating method comprising:
Step 1, receiving and authenticating, by a back-end authentication system, a current dynamic password generated by a dynamic token, and
  generating key updating information and proceeding to step 2 in the case where the authentication succeeds; quitting the key updating in the case where the authentication fails;
Step 2, generating, by the back-end authentication system, a first updating key with the key updating information and a first initial key stored in the back-end authentication system, copying, by the back-end authentication system, the first updating key to a buffer of the first initial key to update the first initial key with the first updating key in the case where the back-end authentication system fails to authenticate a dynamic password with the first initial key and succeeds in authenticating the dynamic password with the first updating key; obtaining and authenticating, by the dynamic token, the key updating information, generating, by the dynamic token, a second updating key according to the key updating information and a second initial key stored in the dynamic token and copying the second updating key to a buffer of the second initial key to update the second initial key with the second updating key in the case where the authentication succeeds; or quitting, by the dynamic token, the key updating in the case where the authentication fails to update the second initial key with the second updating key, wherein the key updating information comprises a first key updating password and an updating factor.

2. The method of claim 1, wherein, the back-end authentication system generating the key updating information comprises:
  generating, by the back-end authentication system, a first key updating password and a random number;
  obtaining, by the back-end authentication system, a checksum of the first key updating password and the random number; and
  combining, by the back-end authentication system, the random number with the checksum to get an updating factor;
  the back-end authentication system generating a first updating key with the key updating information and the first initial key stored in the back-end authentication system comprises:
    combining, by the back-end authentication system, the first key updating password with the updating factor and the first initial key stored in the back-end authentication system to get first data; and
    generating, by the back-end authentication system, a first updating key with the first data.

3. The method of claim 1, wherein, the dynamic token authenticating the key updating information comprises:
  obtaining, by the dynamic token, the first key updating password and the updating factor, computing a checksum of the first key updating password and the updating factor and determining whether the checksum is 0;
  determining, by the dynamic token, whether a second key updating password generated by the dynamic token matches the first key updating password in the case where the checksum is 0,
  the authentication succeeds in the case where the second key updating password matches the first key updating password;
  the authentication fails in the case where the second key updating password does not match the first key updating password;
  the dynamic token generating the second updating key with the key updating information and the second initial key stored in the dynamic token comprises:
    combining, by the dynamic token, the updating factor with the second initial key and the second key updating password which matches the first key updating password to get second data; and
    generating, by the dynamic token, the second updating key according to the second data.

4. The method of claim 1, wherein the key updating information is a key updating response value.

5. The method of claim 4, wherein, the back-end authentication system generating the key updating information comprises:
  obtaining, by the back-end authentication system, a token random number and business information, and generating a token random number response value according to the token random number and generating a business information message value according to the business information;
  combining, by the back-end authentication system, the token random number response value with the business information message value to get third data;
  obtaining, by the back-end authentication system, a checksum of the third data and
  combining, by the back-end authentication system, the checksum with the third data to get a key updating response value;
  the back-end authentication system generating the first updating key according to the key updating information and the first initial key stored in the back-end authentication system comprises:
    combining, by the back-end authentication system, the key updating response value with the token random number and the first initial key to get fourth data; and
    generating, by the back-end authentication system, the first updating key according to the fourth data.

6. The method of claim 4, wherein, the dynamic token authenticating the key updating information comprises:
  obtaining, by the dynamic token, the key updating response value;
  computing, by the dynamic token, a checksum of the key updating response value;
  determining, by the dynamic token, whether the checksum is 0;
  obtaining, by the dynamic token, a first token random number response value from the key updating response value in the case where the checksum is 0;
  obtaining, by the dynamic token, a second token random number response value from a token random number of the dynamic token itself;
  determining, by the dynamic token, whether the first token random number response value is identical to the second token random number response value;
  the authentication succeeds in the case where the first token random number response value is identical to the second token random number response value;
  the authentication fails in the case where the first token random number response value is not identical to the second token random number response value;
  the dynamic token generating the second updating key with the key updating information and the second initial key stored in the dynamic token comprises:
    combining, by the dynamic token, the key updating response value with the token random number and the second initial key to get fifth data; and
    generating, by the dynamic token, the second updating key with the fifth data.

7. The method of claim 1, wherein the key updating information is a token active code;
  the back-end authentication system generating the first updating key with the key updating information and the first initial key stored in the back-end authentication system comprises:
    combining, by the back-end authentication system, the token active code with the first initial key to get sixth data; and
    generating, by the back-end authentication system, the first updating key according to the sixth data;
  the dynamic token generating the second updating key with the key updating information and the second initial key stored in the dynamic token comprises:
    combining, by the dynamic token, the token active code with the second initial key to get seventh data; and
    generating, by the dynamic token, the second updating key according to the seventh data.

8. A key updating method comprising:
  Step 1, generating, by a dynamic token, an active code;
  Step 2, obtaining and authenticating, by a back-end authentication system, the active code, and
  proceeding to step 3 in the case where the authentication succeeds;
  quitting the key updating in the case where the authentication fails;

Step 3, generating, by the back-end authentication system, a first updating key according to the active code and a first initial key stored in the back-end authentication system, copying, by the back-end authentication system, the first updating key to a buffer of the first initial key to update the first initial key with the first updating key in the case where the back-end authentication system fails to authenticate a dynamic password with the first initial key and succeeds in authenticating the dynamic password with the first updating key, and generating, by the dynamic token, a second updating key according to the active code and a second initial key stored in the dynamic token itself and copying the second updating key to a buffer of the second initial key to update the second initial key with the second updating key.

9. The method of claim 8, wherein, the back-end authentication system generating a first updating key according to the active code and a first initial key stored in the back-end authentication system comprises:
  combining, by the back-end authentication system, the active code with the first initial key to get eighth data; and
  generating, by the back-end authentication system, the first updating key according to the eighth data.

10. The method of claim 8, wherein, the dynamic token generating a second updating key according to the active code and a second initial key stored in the dynamic token itself comprises:
  combining, by the dynamic token, the active code with the second initial key to get ninth data; and
  generating, by the dynamic token, the second updating key according to the ninth data.

11. A key updating system comprising a back-end authentication system and a dynamic token, wherein, the back-end authentication system is configured to receive and authenticate a current dynamic password generated by the dynamic token, if the authentication fails, to quit the key updating or if the authentication succeeds, to generate key updating information and generate a first updating key according to the key updating information and a first initial key stored in the back-end authentication system; if the back-end authentication system fails to authenticate the dynamic password with the first initial key and succeeds in authenticating the dynamic password with the first updating key, to copy the first updating key to a buffer of the first initial key to update the first initial key with the first updating key; and
  the dynamic token is configured to obtain and authenticate the key updating information, if the authentication fails, to quit the key updating, or if the authentication succeeds, to generate a second updating key according to the key updating information and a second initial key stored in the dynamic token and copy the second updating key to a buffer of the second initial key to update the second initial key with the second updating key, wherein the key updating information comprises a first key updating password and an updating factor.

12. The system of claim 11, wherein, the back-end authentication system is configured to generate the first key updating password and a random number, to obtain a checksum of the first key updating password and the random number and combine the random number with the checksum to get an updating factor; and
  the back-end authentication system is configured to combine the first key updating password with the updating factor and the first initial key stored in the back-end authentication system to get first data and to generate the first updating key according to the first data.

13. The system of claim 11, wherein, the dynamic token is configured to obtain the first key updating password and the updating factor, compute a checksum of the first key updating password and the updating factor and determine whether the checksum is 0; to determine whether a second key updating password generated by the dynamic token matches the first key updating password in the case where the checksum is 0, the authentication succeeds in the case where the second key updating password matches the first key updating password; the authentication fails in the case where the second key updating password does not match the first key updating password;
  the dynamic token is configured to combine the updating factor with the second initial key and the second key updating password which match the first key updating password to get second data and generate the second updating key according to the second data.

14. The system of claim 11, wherein the key updating information is a key updating response value.

15. The system of claim 14, wherein, the back-end authentication system is configured to obtain a token random number and business information, to generate a token random number response value according to the token random number and generate a business information message value according to the business information; to combine the token random number response value with the business information message value to get third data; to obtain a verification value of the third data and combine the verification value with the third data to get the key updating response value; and
  the back-end authentication system is configured to combine the key updating response value with the token random number and the first initial key to get fourth data and generate the first updating key according to the fourth data.

16. The system of claim 14, wherein, the dynamic token is configured to obtain the key updating response value and compute a checksum of the key updating response value, to determine whether the checksum is 0 and if the checksum is 0, to obtain a first token random number response value from the key updating response value, and to obtain a second token random number response value according to a token random number of the dynamic token itself, to determine whether the first token random number response value is identical to the second token random number response value, the authentication succeeds in the case where the first token random number response value is identical to the second token random number response value; the authentication fails in the case where the first token random number response value is not identical to the second token random number response value;
  the dynamic token is configured to combine the key updating response value with the token random number and the second initial key to get fifth data and generate the second updating key according to the fifth data.

17. The system of claim 11, wherein the key updating information is a token active code;
  the back-end authentication system is configured to combine the token active code with the first initial key to get sixth data and generate the first updating key according to the sixth data; and
  the dynamic token is configured to combine the token active code with the second initial key to get seventh data and generate the second updating key according to the seventh data.

18. A key updating system comprising a back-end authentication system and a dynamic token, wherein, the back-end authentication system is configured to obtain and authenticate an active code generated by the dynamic token, if the authentication fails, to quit the key updating; or if the authentication succeeds, to generate a first updating key according to the active code and a first initial key stored in the back-end authentication system, and if the back-end authentication system fails to authenticate the dynamic password with the first initial key and succeeds in authenticating the dynamic password with the first updating key, to copy the first updating key to a buffer of the first initial key to update the first initial key with the first updating key;

the dynamic token is configured to generate the active code and generate a second updating key according to the active code and a second initial key stored in the dynamic token itself and copy the second updating key to a buffer of the second initial key to update the second initial key with the second updating key;

the back-end authentication system is configured to combine the active code and the first initial key to get eighth data and generate the first updating key according to the eighth data; and  the dynamic token is configured to combine the active code with the second initial key to get ninth data and generate the second updating key according to the ninth data.

\* \* \* \* \*